Patented Oct. 23, 1951

2,572,076

UNITED STATES PATENT OFFICE 2,572,076

PHOSPHORUS-CONTAINING RESINS AND THE METHOD OF PREPARING THE SAME

Arthur Dock Fon Toy, Chicago, Ill., assignor to Victor Chemical Works

No Drawing. Application November 1, 1947, Serial No. 783,630

15 Claims. (Cl. 260—61)

This invention relates to organic phosphorus containing resins and more particularly to condensation products of phosphorus dihalide compounds with chlorinated aromatic dihydroxy compounds in which the hydroxy radicals are on non-adjacent carbon atoms.

This application is a continuation-in-part of my copending application Serial No. 516,713, filed January 1, 1944, now U. S. Patent 2,435,252, dated February 3, 1948.

I have discovered that organic phosphorus dihalide compounds will condense with chlorinated dihydroxy aromatic compounds wherein the hydroxy radicals are on non-adjacent carbon atoms, thereby liberating hydrogen chloride and forming resins of the linear polymer type, when mixtures of these compounds are heated, preferably under vacuum.

The organic phosphorus compounds considered suitable as starting materials may be arylphosphorus oxydihalides, alkylphosphorus oxydihalides, arylphosphorus sulfodihalide, alkylphosphorus sulfodihalide, arylphosphorus dihalides, alkylphosphorus dihalides, and similar compounds where the aryl or alkyl groups may contain substituted groups or radicals. Because of their availability, phenyl phosphorus oxydichloride, phenyl phosphorus sulfodichloride, and phenyl phosphorus dichloride are particularly the subject of this invention.

The hydroxy aromatic compounds which are suitable when chlorinated include such compounds as hydroquinone, resorcinol, dihydroxy naphthalenes, dihydroxy diphenyls, and the like, so long as the hydroxy radicals are attached to non-adjacent carbon atoms. All of these compounds will contain a chlorine substituted aryl group. Where the hydroxy radicals are on adjacent carbon atoms, their reaction with the phosphorus compounds gives a closed ring, definite type ester, whereas with non-adjacent hydroxy radicals there is no ring closure and the resulting product is a linear polymer.

The reaction for producing the linear type polymer may be illustrated by the following equation, showing the reaction of phenyl phosphorus oxydichloride and dichlorohydroquinone:

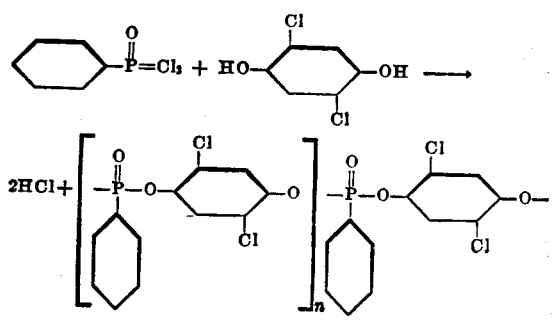

Variations in the time, temperature, and pressure conditions affect the physical characteristics of the resin product.

Another typical reaction wherein the chlorinated hydroquinone is a tetrachlorohydroquinone is as follows:

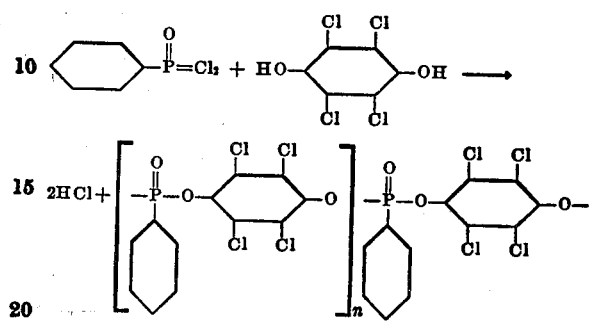

Mono and trichloro hydroquinones may likewise be reacted with a phosphorus dihalide compound to form linear polymers. The chlorine substituents on the hydroquinone may be attached to any of the four available carbon atoms. In the above reactions, the oxygen that is double bonded to the phosphorus atom may be replaced by sulfur.

It is believed readily apparent that the above type reaction will take place to form a linear polymer with any chlorinated dihydroxy aryl compound wherein the hydroxy radicals occupy non-adjacent carbon atoms. In all cases, the resulting polymer will contain repeating units of

where R is a chlorine substituted arylene group and X is either oxygen or sulfur.

The following examples illustrate typical polymers and the methods of producing them.

*Example I*

41 grams (0.21 mole) of freshly distilled phenylphosphorus oxydichloride ($C_6H_5POCl_2$) was added to 49.6 grams (0.2 mole) of tetrachlorohydroquinone (a buff-colored solid, M. P. 232–8° C., obtained from Eastman). The solid absorbed the liquid forming a hard cake. This was then heated under $CO_2$ to about 170° C. when the reaction started and proceeded smoothly. The solid cake slowly liquefied to a dark colored solution which became a viscous black mass as the time of heating and temperature increased. The heating conditions were as follows:

| Time, hours | Pressure | Temperature, °C. |
|---|---|---|
| 6 | Atm | 170 |
| 16 | Atm | 200 |
| 75 | Atm | 220 |
| 4 | 1 mm | 190 |
| 20.5 | 1 mm | 200 |
| 23 | 1 mm | 236 |
| 24 | 1 mm | 270 |

The resin product was a hard, brittle, black solid having a melting point of 241° C. It was too brittle to be drawn into satisfactory fibers.

*Example II*

The experiment was repeated under the following temperature conditions:

| Time, hours | Pressure | Temperature, °C. |
|---|---|---|
| 5 | Atm | 160-200 |
| 17 | Atm | 203 |
| 4.5 | Atm | 220 |
| 5.0 | 1 mm | 230 |
| 16.0 | 1 mm | 250 |
| 3.0 | 1 mm | 280 |

The resin product was very similar to the above except its melting point was 232–234° C.

It is also possible to make copolymer resins where mixtures of dihydroxy aromatic compounds are employed. For example, phenylphosphorus oxydichloride may be condensed with a mixture of hydroquinone and tetrachlorohydroquinone to give a resin having a probable structure, where equal mole proportions are used, of

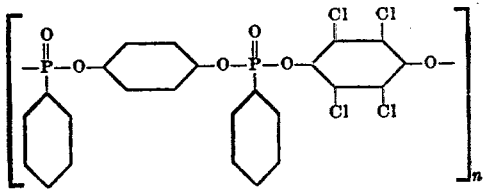

*Example III*

This example shows the use of mixtures of di- and tetrachlorohydroquinone. In this example, 24.8 grams (0.1 mole) of tetrachlorohydroquinone and 18 grams (0.1 mole) of dichlorohydroquinone were heated together with 41 grams (0.21 mole) of phenyl phosphorus oxydichloride under a $CO_2$ atmosphere. All of the solids dissolved at around 150° C. with evolution of hydrogen chloride. Further condensation and polymerization was carried out under the following heating conditions.

| Time, hours | Pressure | Temperature, °C. |
|---|---|---|
| 4 | Atm | 130 |
| 18.5 | Atm | 150 |
| 7.5 | Atm | 160 |
| 23.0 | Atm | 180 |
| 23.0 | 2 mm | 200 |
| 1.5 | 2 mm | 170 |
| 65.0 | 2 mm | 200 |
| 5.0 | 2 mm | 210 |
| 1.0 | 2 mm | 220 |

The product was a hard, translucent, black resin. It had a softening point of about 185° C. and a melting point of 197–210° C. It could be drawn into fibers of moderate strength.

*Example IV*

37.2 grams (0.15 mole) of tetrachlorohydroquinone and 16.5 grams (0.15 mole) of hydroquinone were heated together with 64.4 grams (0.33 mole) of redistilled phenyl phosphorus oxydichloride in an atmosphere of $CO_2$ gas. The reaction proceeded smoothly at 130–140° C. with evolution of hydrogen chloride. The following heating conditions were employed:

| Time, hours | Pressure | Temperature, °C. |
|---|---|---|
| 1 | Atm | 120 |
| 16 | Atm | 135 |
| 3 | Atm | 150 |
| 5 | Atm | 170 |
| 15.5 | Atm | 180 |
| 4 | Atm | 195 |

At this point a glass tube was submerged into the molten mass and $CO_2$ gas bubbled through the resin as the heating was continued as follows:

| Time, hours | Pressure | Temperature, °C. |
|---|---|---|
| 4 | Atm | 195 |
| 19 | Atm | 210 |
| 25 | Atm | 235 |
| 42 | 2 mm | 235 |

The resin product was a hard, translucent black solid, with a melting point of about 190–210° C. It could be drawn into long, fairly strong fibers having some cold drawing strength.

*Example V*

69.6 grams (0.33 mole) of phenylphosphorus sulfodichloride, 37.2 grams (0.15 mole) of tetrachlorohydroquinone, and 16.5 grams (0.15 mole) hydroquinone were heated together, with 0.2 cc. of phenylphosphorus dichloride as a catalyst, under a $CO_2$ atmosphere under the following conditions:

| Time, hours | Pressure | Temperature, °C. |
|---|---|---|
| 2 | Atm | 130 |
| 15 | Atm | 150 |
| 7 | Atm | 190 |
| 70 | Atm | 200 |
| 48 | Atm | 232 |
| 18 | 1 mm | 232 |

The resin product was black and nearly opaque. It had a melting range of 170–180° C., but was too brittle to be drawn into satisfactory fibers.

*Example VI*

61.5 grams (0.315 mole) of freshly distilled phenyl phosphorus oxydichloride and 53.7 grams (0.3 mole) of purified dichlorohydroquinone were heated under a $CO_2$ atmosphere. The heating was carried out under the following conditions:

| Time, hours | Pressure | Temperature, °C. |
|---|---|---|
| 0.5 | Atm | 138 |
| 2.75 | Atm | 155 |
| 15.0 | Atm | 170 |
| 2.5 | Atm | 190 |
| 2.25 | Atm | [1] 210 |
| 2.25 | Atm | 225 |

[1] Estimated.

At this point the mass was very viscous. It was placed under vacuum and the heating continued as follows:

| Time, hours | Pressure | Temperature, °C. |
|---|---|---|
| 15.5 | 1 mm | 165 |
| 3.75 | 1 mm | 190 |
| 4.25 | 1 mm | 205 |
| 87.75 | 1 mm | 225 |

The product was a hard, tough resin with a melting point of 180–186° C. It was somewhat rubbery at its melting point and could be drawn into fairly strong fibers.

From the above examples, it is readily seen that a large number of phosphorus-containing linear type polymers can be made depending upon the reaction and polymerizing conditions employed. These resins have utility in the production of artificial fibers, lacquer coatings, mold compositions, laminated glass, plasticizers for cellulose plastics, lubricating additives, fire retardent additives in inflammable plastics and the like.

The foregoing detailed description has been given for clearness of understanding only and no unnecessary limitations should be understood therefrom.

I claim:

1. A fusible linear polymer in which the repeating units consist of

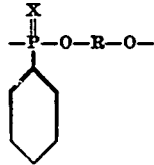

wherein R is an aromatic nucleus containing only chlorine substituents with said oxygen linkages being only on non-adjacent carbon atoms of the aromatic nucleus and X is a member of the class consisting of oxygen and sulfur.

2. The polymer of claim 1 wherein X is oxygen.

3. The polymer of claim 1 wherein X is sulfur.

4. The polymer of claim 1 wherein R is a dichloro phenylene group.

5. The polymer of claim 1 wherein R is a tetrachloro phenylene group.

6. The polymer of claim 1 wherein the repeating unit is

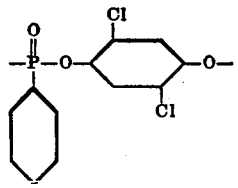

7. The polymer of claim 1 wherein the repeating unit is

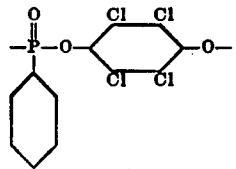

8. The method of producing phosphorus-containing resins which comprises heating a phosphorus compound having the formula $RPYCl_2$ and a dihydroxy compound having the formula $HOR'OH$ wherein R is an aryl nucleus, Y is a member of the class consisting of oxygen and sulfur, R' is a chlorinated arylene nucleus containing only chlorine substituents, and the OH groups are on non-adjacent carbon atoms, the heating being carried out initially at a temperature sufficient to cause condensation with liberation of hydrogen chloride, then under reduced pressure at a temperature and period of time sufficient to effect a high degree of polymerization, said phosphorus compound and said dihydroxy compound being employed in substantially equal molecular proportions.

9. A fusible linear polymer of the class consisting of polymers containing only the repeating unit:

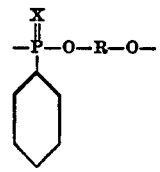

and polymers containing mixtures of the units:

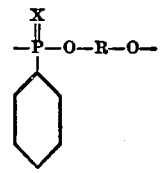

and

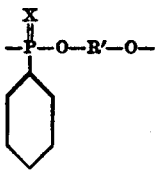

wherein X is a member of the class consisting of sulfur and oxygen, R is a chlorinated aromatic nucleus containing only chlorine substituents, and R' is an unsubstituted aromatic nucleus, each of said units having the oxygen linkages on nonadjacent carbon atoms of the corresponding aromatic nucleus.

10. A fusible linear polymer containing only the repeating units:

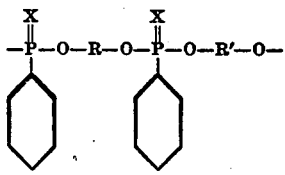

wherein X is a member of the class consisting of sulfur and oxygen, R is a chlorinated aromatic nucleus containing only chlorine substituents, and R' is an unsubstituted aromatic nucleus, each of said units having the oxygen linkages on nonadjacent carbon atoms of the corresponding aromatic nucleus.

11. The polymer of claim 10 wherein R is a dichloro phenylene group and R' is a phenylene group.

12. The polymer of claim 10 wherein R is a tetrachloro phenylene group and R' is a phenylene group.

13. The method of producing phosphorus-containing resins which comprises heating phenyl phosphorus oxydichloride and a dihydroxy compound having the formula HOR'OH wherein R' is a chlorinated arylene nucleus containing only chlorine substitutents and the OH groups are on non-adjacent carbon atoms, the heating being carried out initially at a temperature sufficient to cause condensation with liberation of hydrogen chloride, then under reduced pressure at a temperature and period of time sufficient to effect a high degree of polymerization, said phosphorus compound and said dihydroxy compound being employed in substantially equal molecular proportions.

14. The method of producing phosphorus-containing resins which comprises heating a phosphorus compound having the formula RPYCl₂ wherein R is an aryl nucleus and Y is a member of the class consisting of oxygen and sulfur with dichlorohydroquinone, the heating being carried out initially at a temperature sufficient to cause condensation with liberation of hydrogen chloride, then under reduced pressure at a temperature and period of time sufficient to effect a high degree of polymerization, said phosphorus compound and said dichlorohydroquinone being employed in substantially equal molecular proportions.

15. The method of producing phosphorus-containing resins which comprises heating a phosphorus compound having the formula RPYCl₂ wherein R is an aryl nucleus and Y is a member of the class consisting of oxygen and sulfur with tetrachlorohydroquinone, the heating being carried out initially at a temperature sufficient to cause condensation with liberation of hydrogen chloride, then under reduced pressure at a temperature and period of time sufficient to effect a high degree of polymerization, said phosphorus compound and said tetrachlorohydroquinone being employed in substantially equal molecular proportions.

ARTHUR DOCK FON TOY.

No references cited.